Patented Dec. 13, 1938

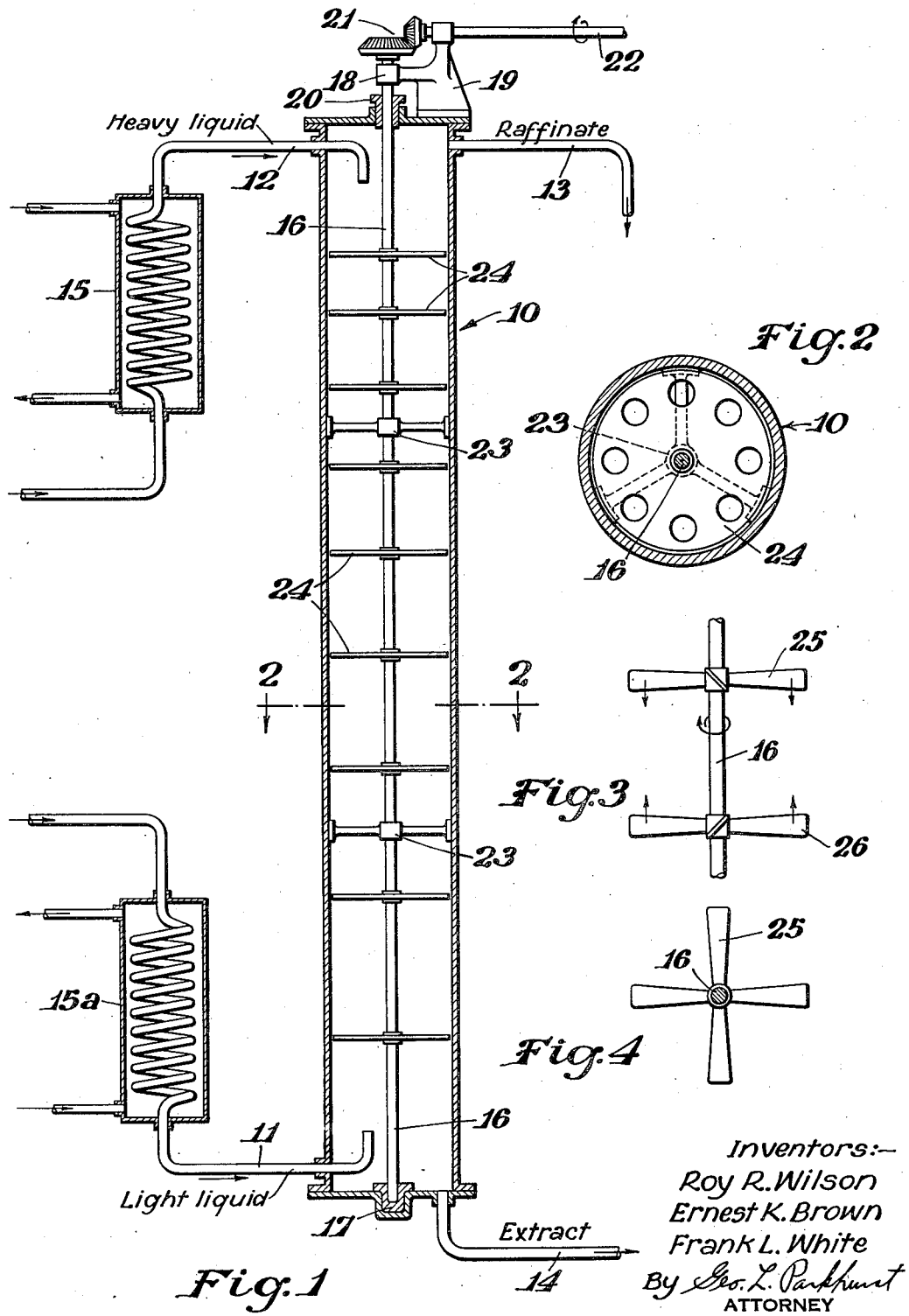

2,139,871

UNITED STATES PATENT OFFICE 2,139,871

PROCESS AND APPARATUS FOR CONTACTING TWO LIQUIDS

Roy R. Wilson, Ernest K. Brown, and Frank L. White, Casper, Wyo., assignors to Standard Oil Company, Chicago, Ill., a corporation of Indiana Application August 6, 1937, Serial No. 157,752

7 Claims. (Cl. 196—13)

This invention relates to a process and apparatus for contacting two liquids and more particularly to a process and apparatus for solvent extraction. Still more particularly it relates to a tower type of contacting apparatus in which the spacing of agitation zones and settling zones is progressively varied throughout at least a portion of the length of the tower.

In the art of solvent extracting lubricating oils and other petroleum fractions, a petroleum fraction is passed countercurrent to a stream of selective solvent. Other processes also exist in which it is desired to contact two incompletely miscible liquids differing in specific gravity. Such contacting operations have sometimes been carried out in towers, the heavier liquid being introduced at the top and the lighter liquid at the bottom and the two resulting streams being removed from opposite ends of the tower. Such towers have been provided with various types of devices for improving contact. They have, for instance, been provided with baffles, packing and agitators. However, we have found that the towers heretofore used have not achieved the maximum possible capacity and have not accomplished as thorough contacting as can be accomplished.

It is an object of our invention to provide a contacting process and apparatus of the tower type having improved capacity. It is a further object of our invention to provide a contacting process and apparatus in which the efficiency is improved. Another and more detailed object of our invention is to provide contacting apparatus of the tower type in which the agitation existing within the tower is progressively varied in accordance with the volumes of liquid being handled in unit time at various levels in the tower. Another detailed object of our invention is to provide a contacting tower in which agitation is proportioned to the viscosities or emulsibilities of the liquids present at various levels in the tower. Other and more detailed objects of our invention will become apparent as the description thereof proceeds.

Our invention will be described with particular reference to specific embodiments thereof shown in the accompanying drawing which is to be read as part of this specification. However, it is to be understood that other embodiments of our invention will be apparent to those skilled in the art and that we do not limit ourselves to the embodiments shown and described.

In the drawing:

Figure 1 is a sectional elevation of the apparatus of our invention;

Figure 2 is a horizontal section taken along the line 2—2 of Figure 1, showing one of the agitators in plan view;

Figure 3 is an elevation showing an alternative type of agitator; and

Figure 4 is a plan view corresponding to Figure 3.

Turning now to Figure 1, a vertical elongated cylindrical shell or tower 10 is equipped with line 11 located near the bottom for introducing the light liquid and with line 12 entering the tower near the top for introducion of the heavy liquid. The two liquids pass through the tower in countercurrent flow and the resultant light liquid is removed from the top of the tower through line 13. Similarly the resultant heavy liquid is removed from the bottom of the tower through line 14.

The heavy liquid may suitably be a selective solvent such as "Chlorex" (beta beta' dichlordiethyl ether), phenol, furfural, etc. and the light liquid may suitably be a lubricating oil stock. One important factor in the contacting operation is the temperatures of the liquids being introduced. These temperatures are controlled by heat exchangers 15 and 15a. Tower 10 can suitably be insulated to maintain a constant temperature or it can be provided with heaters and/or coolers to give a temperature gradient throughout the length of the tower.

Within tower 10 is a vertical agitator shaft 16 which turns on thrust bearings 17 at the bottom of the tower. The top of shaft 16 is supported by bearing 18 carried by bracket 19 at the top of the tower. Shaft 16 enters tower 10 through stuffing box 20. The shaft is driven at any desired rate of speed, preferably at a low rate of speed, by means of gears 21 and shaft 22 leading to a motor or other source of power not shown. Shaft 16 is supported at intermediate elevations within the tower by bearings 23.

It will be noted that shaft 16 carries a large number of agitators 24 and that these agitators have a graduated spacing from the top to the bottom of the tower, the top agitators being close together while the bottom ones are far apart. It will also be noted that a settling space, free from agitation, is provided at each end of the tower.

We have constructed an experimental tower of this type made of glass. The tower was 84 inches long and 1¾ inches in internal diameter. A settling space of 6 inches was provided at the bottom and a similar settling space was provided at the top of the tower. The agitators were adjustable in position. We found that with uniform spacing of agitators serious emulsification occurred toward the bottom of the tower, whereas near the top of the tower the operation was satisfactory. This emulsification, of course, slowed down the operation very seriously and made the operation far less efficient than it should have been. By graduating the spacing of these agitators we found it possible to overcome this difficulty. In one arrangement which was found to give good results, the spacing varied progressively from 2½ inches for the two lowest agitators to ¼ inch for the two highest agitators using the perforated disk type of agitator shown in Figures 1 and 2.

We have also found that other types of agitators can be used satisfactorily; for instance, the type shown in Figures 3 and 4 in which alternate paddles 25 are arranged to impel the liquids downward while the remaining paddles 26 are arranged to impel the liquids upward.

There are at least two explanations for the highly important results obtained by the use of graduated agitators in a tower type contacting apparatus. One is that the volumes of material being handled in unit time varies, in most instances, very greatly throughout the tower. This can be illustrated by an example. In the solvent extraction of a lubricating oil stock with Chlorex, a ratio of solvent to oil of 2:1 is usual. We will therefore assume that 200 volumes of Chlorex are introduced at the top of the tower through line 10 and that 100 volumes of lubricating oil stock are introduced at the bottom of the tower through line 11. It is, however, desirable and practically necessary to dilute the lubricating oil stock to reduce its viscosity and this is done by adding twelve volumes of spent Chlorex to it, making the total liquid introduced through line 11 in unit time 112 volumes. The twelve volumes of spent Chlorex contain ten volumes of Chlorex and two of oil. The extract phase removed through line 14 contains 200 volumes of Chlorex plus 32 volumes of extract hydrocarbons or a total of 232 volumes. Similarly the raffinate phase contains 70 volumes of raffinate hydrocarbons with about 10 volumes of Chlorex dissolved therein. Thus the total volume of liquid being handled at the top of the tower in unit time is the 200 volumes introduced through line 12 and the 80 volumes withdrawn through line 13 or a total of 280 volumes. At the bottom of the tower, however, 112 volumes are being introduced through line 11 and 232 volumes withdrawn through line 14 so that the total handled in unit time is 344 volumes. Since the volume of material being handled at the bottom of the tower is much greater than at the top of the tower it is apparent that to secure uniform effect or uniform total spacial velocity throughout the tower a larger ratio of settling space to agitation space must be provided at the bottom of the tower.

The other factor contributing to the desirability of graduated spacing of agitators is the viscosity or emulsibility factor. In the example given the oil as it progresses upward through the tower picks up more Chlorex and loses its own most viscous constituents, thereby becoming less and less viscous throughout its upward progression. The Chlorex, on the other hand, entering at the top of the tower picks up progressively increasing quantities of viscous hydrocarbons and its viscosity increases during its downward path. In other words, the viscosity of each liquid is at a maximum at the bottom of the tower and at a minimum at the top of the tower. The reason for this is that the highly viscous extract hydrocarbons are thrown downward by the Chlorex and their concentration diminishes rapidly as the tower is ascended. Since the viscosities of the two liquids are one of the principal factors affecting their emulsibility and since emulsions must be avoided if the tower is to operate with reasonable capacity, it is apparent that the spacing should be greatest at the bottom of the tower and should progressively diminish.

While we prefer to have the spacing of our agitators progressively diminish throughout substantially the whole tower, it will be apparent that a progressive variation throughout a portion of the tower with uniform spacing throughout the rest of the tower will often be satisfactory and it will also be apparent that the spacing need not be varied in uniform steps.

In some instances the spacing of the agitators should increase rather than diminish as the tower is ascended. This is true, for instance, when contacting an oil with a liquefied normally gaseous hydrocarbon such as propane. In such applications the solvent is the lighter liquid and passes up through the tower so that, in general, the spacing should increase in the direction of solvent flow.

Instead of using progressively spaced agitators, the agitators can be uniformly spaced and the effectiveness of the agitators can be varied progressively. Thus the agitators of Figures 3 and 4 can be uniformly spaced and the pitch of the blades can be varied so that little agitation takes place at the bottom of the tower as compared with that at the top.

We have described our invention with particular reference to a tower equipped with rotating agitators but it is to be understood that it is not so limited. In our specific embodiments settling zones exist between the agitation zones. In the agitation zones the two partially immiscible liquids are brought into intimate contact while in the settling zones they separate and pursue their countercurrent paths to the respectively higher and lower agitation zones. It will thus be seen that our invention has to do with a spacing of agitation and settling zones and that it is not necessarily limited to progressively spaced rotating agitators since other methods of securing agitation can be used.

We claim:

1. A method of countercurrently contacting an oil with a solvent partially immiscible with said oil and differing from said oil in specific gravity comprising passing said oil and said solvent in countercurrent contact with each other through a plurality of vertically disposed agitating zones and settling zones alternating with each other and progressively decreasing the ratio of agitation to settling in the direction of flow of said solvent.

2. A tower for the countercurrent contacting of two partially immiscible liquids of differing specific gravities comprising means for introducing said two liquids near opposite ends of said tower, means for withdrawing the two resultant liquid phases near opposite ends of said tower and means forming alternate agitation and settling zones, the size of said settling zones increasing by progressive increments throughout at least a substantial portion of the length of said tower.

3. A tower for the countercurrent contacting of two partially immiscible liquids of differing specific gravities comprising means for introducing said two liquids near opposite ends of said tower, means for withdrawing the two resultant liquid phases near opposite ends of said tower and agitating means disposed at various levels in said tower, the spacing between said agitating means varying by progressive increments throughout at least a major portion of the length of said tower.

4. A tower for the countercurrent contacting of an oil with a solvent partially immiscible therewith and differing in specific gravity therefrom comprising means for introducing said oil near one end of said tower, means for introducing said solvent near the opposite end of said tower, means for withdrawing the resultant raffinate and extract phases near opposite ends of said tower and agitating means within said tower, said agitating means being spaced relatively close together near the end of said tower at which said solvent is introduced and relatively far apart near the end of said tower opposite the end at which said solvent is introduced.

5. A tower according to claim 4 in which said agitating means comprise rotatable agitators.

6. A tower for the countercurrent contacting of two partially immiscible liquids of differing specific gravities comprising means for introducing said two liquids near opposite ends of said tower, means for withdrawing the two resultant liquid phases near opposite ends of said tower, a shaft substantially vertically and centrally placed within said tower, means for rotating said shaft, and a large number of agitators arranged at varying levels in said tower and attached to said shaft, said agitators being spaced relatively close together near the top of said tower and spaced relatively far apart near the bottom of said tower.

7. A tower for the countercurrent contacting of an oil with a solvent comprising means for introducing said oil and said solvent at opposite ends of said tower, means for withdrawing the resultant raffinate and extract phases near opposite ends of said tower, and agitating means disposed at various levels in said tower, the spacing between said agitating means varying by progressively increasing increments in the direction of flow of said solvent in said tower.

ROY R. WILSON.
ERNEST K. BROWN.
FRANK L. WHITE.